US008097066B2

(12) United States Patent
Gonze et al.

(10) Patent No.: US 8,097,066 B2
(45) Date of Patent: Jan. 17, 2012

(54) PREDICTING ASH LOADING USING AN ELECTRICALLY HEATED PARTICULATE FILTER

(75) Inventors: Eugene V. Gonze, Pinckney, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 443 days.

(21) Appl. No.: 12/465,047

(22) Filed: May 13, 2009

(65) Prior Publication Data

US 2010/0287912 A1 Nov. 18, 2010

(51) Int. Cl.
*B01D 46/46* (2006.01)
(52) U.S. Cl. .......... 95/1; 55/282.3; 55/283; 55/523; 55/DIG. 10; 55/DIG. 30; 95/26; 95/278; 96/425; 60/285; 60/311
(58) Field of Classification Search .......... 55/282.3, 55/522–524; 422/169–172, 177–182; 60/258, 60/297, 295, 311
See application file for complete search history.

(56) References Cited

U.S. PATENT DOCUMENTS

| 5,195,316 | A | * | 3/1993 | Shinzawa et al. | 60/274 |
| 6,405,528 | B1 | * | 6/2002 | Christen et al. | 60/295 |
| 7,340,887 | B2 | * | 3/2008 | Ante et al. | 60/297 |
| 7,607,295 | B2 | * | 10/2009 | Yokoyama et al. | 60/297 |
| 7,685,811 | B2 | * | 3/2010 | Taylor et al. | 60/277 |
| 7,794,528 | B2 | * | 9/2010 | Tochikawa et al. | 96/408 |
| 7,896,956 | B2 | * | 3/2011 | Takase et al. | 95/278 |
| 2003/0000188 | A1 | * | 1/2003 | Harada et al. | 55/523 |
| 2003/0131592 | A1 | * | 7/2003 | Saito et al. | 60/295 |
| 2004/0134187 | A1 | * | 7/2004 | Inoue et al. | 60/291 |
| 2006/0075731 | A1 | * | 4/2006 | Ohno et al. | 55/523 |
| 2007/0245721 | A1 | * | 10/2007 | Colignon | 60/288 |
| 2008/0295483 | A1 | * | 12/2008 | Scaife et al. | 60/274 |
| 2009/0158715 | A1 | * | 6/2009 | Stroh et al. | 60/295 |
| 2010/0126145 | A1 | * | 5/2010 | He et al. | 60/286 |

* cited by examiner

*Primary Examiner* — Duane Smith
*Assistant Examiner* — Amber Orlando

(57) ABSTRACT

A control system includes a heater control module, a measured duration module, and a regeneration volume module. The heater control module selectively initiates a regeneration in a zone of a particulate filter in an exhaust system. The measured duration module measures a duration of the regeneration. The regeneration volume module determines an available volume within the particulate filter to regenerate particulate based on the measured duration of the regeneration.

20 Claims, 5 Drawing Sheets

PREDICTING ASH LOADING USING AN ELECTRICALLY HEATED PARTICULATE FILTER

FIELD

The present disclosure relates to controlling an electrically heated particulate filter.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts a mixture of air and fuel, producing drive torque. Engines such as diesel engines and compression ignition engines produce particulate matter (PM) that is filtered from exhaust gas by a particulate filter. The filter reduces PM by collecting and storing PM. Over time, the amount of PM stored in the filter may increase. A full filter may decrease exhaust flow relative to a clean filter.

During regeneration, the filter may be cleaned by burning PM within the filter. Regeneration may involve heating the filter to a combustion temperature to ignite PM. Combustion of PM further increases the filter temperature. The rate of regeneration of the filter and the filter temperature may be affected by an oxygen level in the exhaust. Increased oxygen levels in the exhaust may increase the rate of regeneration and the filter temperature.

There are various ways to perform regeneration, including modifying engine control, using a fuel burner, using a catalytic oxidizer, using microwave energy, and/or using resistive heating coils. The resistive heating coils may be arranged in contact with the filter to allow heating by both conduction and convection.

Engines may produce ash that accumulates near an outlet of the filter. Combustion of ash requires higher temperatures than combustion of PM. The higher temperatures (e.g., near 1400° C.) required to combust ash may damage the filter. Thus, regeneration may be conducted at lower temperatures that combust PM but do not combust ash. As a result, an amount of ash stored in the filter may increase over time. As the amount of ash stored in the filter increases, a volume available within the filter to regenerate PM decreases.

SUMMARY

A control system includes a heater control module, a measured duration module, and a regeneration volume module. The heater control module selectively initiates a regeneration in a zone of a particulate filter in an exhaust system. The measured duration module measures a duration of the regeneration. The regeneration volume module determines an available volume within the particulate filter to regenerate particulate based on the measured duration of the regeneration.

A method includes selectively initiating a regeneration in a zone of a particulate filter in an exhaust system, measuring a duration of the regeneration, and determining an available volume within the particulate filter to regenerate particulate based on the measured duration of the regeneration.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
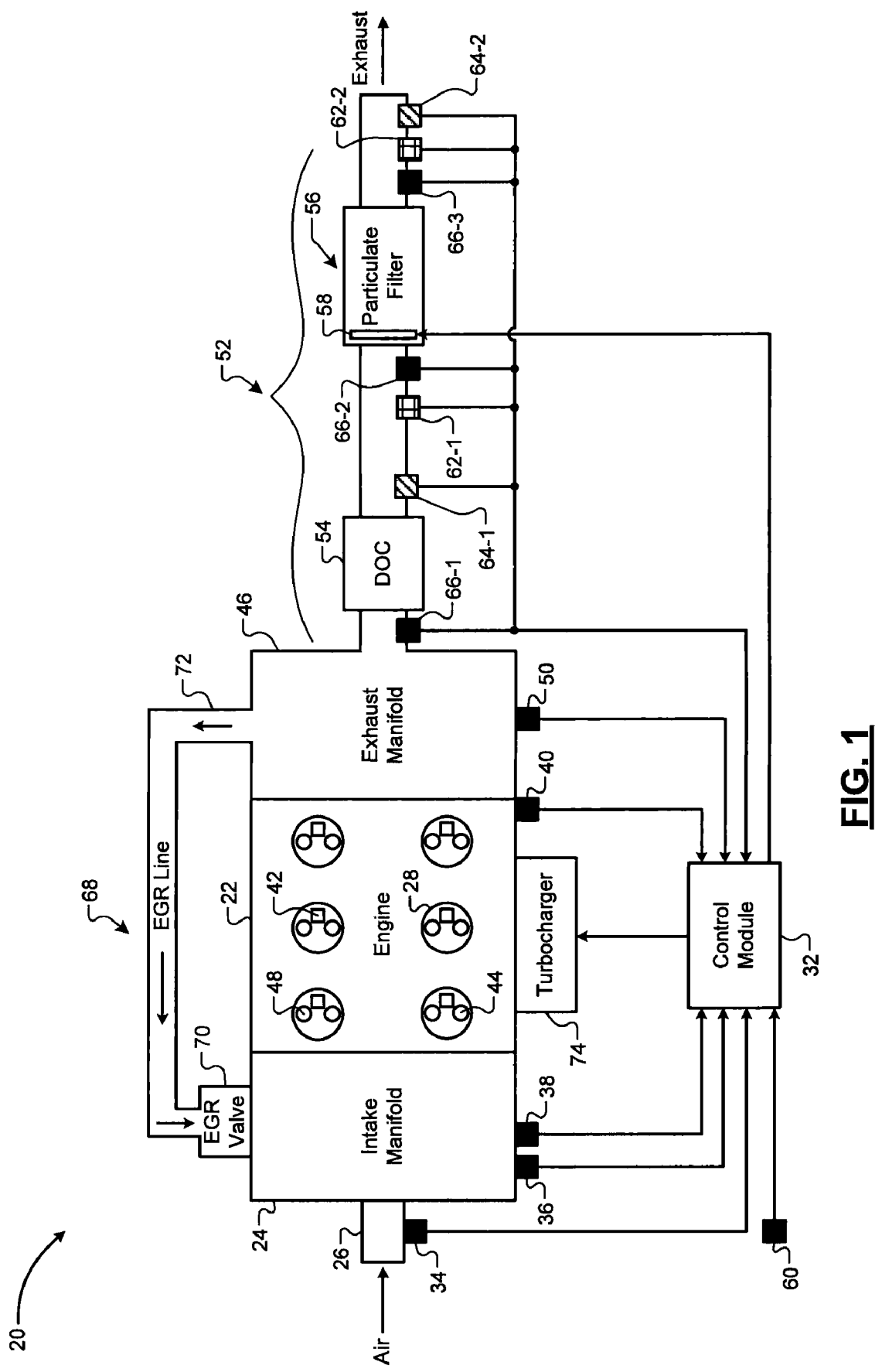
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An electrically heated particulate filter control system and method of the present disclosure selectively initiates regeneration of particulate matter (PM) in one or more zones of an inlet face of a particulate filter. A predicted duration of the regeneration may be determined based on a temperature of an exhaust, a mass flow rate of the exhaust, an oxygen level in the exhaust, and/or a particulate matter (PM) level in the exhaust. A measured duration of the regeneration may be determined based on a temperature in the particulate filter. An available volume within the particulate filter to regenerate PM may be determined based on the predicted and measured durations determined for each of the zones.

PM regeneration produces ash that accumulates in the particulate filter, which reduces the available volume within the particulate filter to regenerate PM. A density of PM in the particulate filter may increase if a reduction in the available volume within the particulate filter is not taken into account. The increased density of PM may increase combustion temperatures during PM regeneration, which may damage the particulate filter. Thus, determining the available volume within the particulate filter to regenerate PM may prevent damage to the particulate filter.

In addition, regeneration model accuracy may decrease if the reduction in the available volume within the particulate filter is not taken into account. Thus, determining the available volume within the particulate filter may improve onboard diagnostics (OBD) that use regeneration models, such as incomplete and frequent regeneration diagnostic systems.

The incomplete regeneration diagnostic system determines when regeneration of the particulate filter is incomplete. The frequent regeneration diagnostic system determines when regeneration of the particulate filter occurs too frequently. Incomplete regeneration reduces power by increasing back pressure, and overly frequent regeneration increases emissions. Thus, improving regeneration model accuracy by determining the available volume within the particulate filter may increase power and reduce emissions.

Referring now to FIG. 1, an exemplary diesel engine system 20 is schematically illustrated in accordance with the present disclosure. The diesel engine system 20 is merely exemplary in nature. The electrically heated particulate filter control techniques described herein may be implemented in various engine systems that include a particulate filter. The engine systems may include gasoline direct injection engine systems and homogeneous charge compression ignition engine systems. For ease of the discussion, the disclosure will be discussed in the context of a diesel engine system.

The engine system 20 includes an engine 22 that combusts an air/fuel mixture to produce drive torque. Air is drawn into an intake manifold 24 through an inlet 26. A throttle (not shown) may be included to regulate air flow into the intake manifold 24. Air within the intake manifold 24 is distributed into cylinders 28. Although FIG. 1 depicts six cylinders 28, the engine 22 may include additional or fewer cylinders 28. For example only, engines having 4, 5, 8, 10, 12, and 16 cylinders are contemplated.

A control module 32 communicates with components of the engine system 20. The components may include the engine 22, sensors, and actuators as discussed herein. The control module 32 may implement the electrically heated particulate filter control techniques of the present disclosure.

Air passes through the inlet 26 through a mass airflow (MAF) sensor 34. The MAF sensor 34 generates a MAF signal that indicates a rate of air flowing through the MAF sensor 34. A manifold pressure (MAP) sensor 36 is positioned in the intake manifold 24 between the inlet 26 and the engine 22. The MAP sensor 36 generates a MAP signal that indicates air pressure in the intake manifold 24. An intake air temperature (IAT) sensor 38 located in the intake manifold 24 generates an IAT signal based on intake air temperature.

An engine crankshaft (not shown) rotates at engine speed or a rate that is proportional to engine speed. A crankshaft sensor 40 senses a position of the crankshaft and generates a crankshaft position (CSP) signal. The CSP signal may be related to the rotational speed of the crankshaft and cylinder events. For example only, the crankshaft sensor 40 may be a variable reluctance sensor. The engine speed and cylinder events may be sensed using other suitable methods.

The control module 32 actuates fuel injectors 42 to inject fuel into the cylinders 28. An intake valve 44 selectively opens and closes to enable air to enter the cylinder 28. An intake camshaft (not shown) regulates the intake valve position. A piston (not shown) compresses and combusts the air/fuel mixture within the cylinder 28. The piston drives the crankshaft during a power stroke to produce drive torque. Exhaust gas resulting from the combustion within the cylinder 28 is forced out through an exhaust manifold 46 when an exhaust valve 48 is in an open position. An exhaust camshaft (not shown) regulates the exhaust valve position. An exhaust manifold pressure (EMP) sensor 50 generates an EMP signal that indicates exhaust manifold pressure.

An exhaust treatment system 52 may treat the exhaust. The exhaust treatment system 52 may include a diesel oxidation catalyst (DOC) 54 and a particulate filter assembly 56. The DOC 54 oxidizes carbon monoxide and hydrocarbons in the exhaust based on the post combustion air/fuel ratio. The amount of oxidation increases the temperature of the exhaust.

The filter assembly 56 receives exhaust from the DOC 54 and filters any particulate matter present in the exhaust. An electric heater 58 selectively heats the exhaust and/or the filter to initiate regeneration of the filter assembly 56. A wheel speed sensor 60 generates a signal that indicates a speed of a wheel (not shown) that is driven by the engine system 20. The control module 32 controls the engine 22 and filter regeneration based on various sensed and/or estimated information.

The exhaust treatment system 52 may include exhaust pressure sensors 62-1 and 62-2 (collectively exhaust pressure sensors 62), oxygen sensors 64-1 and 64-2 (collectively oxygen sensors 64), and exhaust temperature sensors 66-1, 66-2, 66-3 (collectively exhaust temperature sensors 66). The exhaust pressure sensors 62 generate signals that indicate pressures of the exhaust. The oxygen sensors 64 generate signals that indicate levels of oxygen in the exhaust. Alternatively, nitrogen oxides sensors (not shown) may be used to detect levels of oxygen in the exhaust.

The exhaust temperature sensors 66 measure the temperatures of the exhaust upstream from the DOC 54 and the filter assembly 56. The exhaust temperature sensors 66 may also measure the temperatures of the exhaust downstream from the filter assembly 56 or between the DOC 54 and the filter assembly 56. The exhaust temperature sensors 66 generate signals that indicate temperatures of the exhaust. The control module 32 may generate an exhaust temperature model to estimate temperatures of the exhaust throughout the exhaust treatment system 52.

The control module 32 may determine a mass flow rate of the exhaust based on the rate of intake air from the MAF sensor 34 and a mass of fuel injected by the fuel injectors 42. The control module 32 controls the heater 58 to selectively initiate regeneration in one or more zones of the filter assembly 56. The control module 32 may determine a predicted duration of the regeneration based on the mass flow rate of the exhaust, the oxygen levels in the exhaust received from the oxygen sensors 64, and/or the temperatures of the exhaust received from the exhaust temperature sensors 66.

The control module 32 may determine a measured duration of the regeneration based on a temperature in the filter assembly 56. The control module 32 may estimate the temperature in the filter assembly 56 based on the temperatures of the exhaust received from the exhaust temperature sensors 66. Alternatively, the control module 32 may receive the temperature in the filter assembly 56 from a temperate sensor (not shown) located in the filter assembly 56. The control module 32 may determine an available regeneration volume within the filter assembly 56 based on the predicted and measured durations.

The engine system 20 may include an EGR system 68. The EGR system 68 includes an EGR valve 70 and an EGR line 72. The EGR system 68 may introduce a portion of exhaust gas from the exhaust manifold 46 into the intake manifold 24. The EGR valve 70 may be mounted on the intake manifold 24. The EGR line 72 may extend from the exhaust manifold 46 to the EGR valve 70, providing communication between the exhaust manifold 46 and the EGR valve 70. The control module 32 may actuate the EGR valve 70 to adjust an amount of exhaust gas introduced into the intake manifold 24.

The engine system 20 may include a turbocharger 74. The turbocharger 74 may be driven by the exhaust gas received through a turbine inlet. For example only, the turbocharger 74 may include a variable nozzle turbine. The turbocharger 74 increases airflow into the intake manifold to cause an increase in intake manifold pressure (i.e., boost pressure). The control module 32 actuates the turbocharger 74 to selectively restrict the flow of the exhaust gas, thereby controlling the boost pressure.

Figure 2:
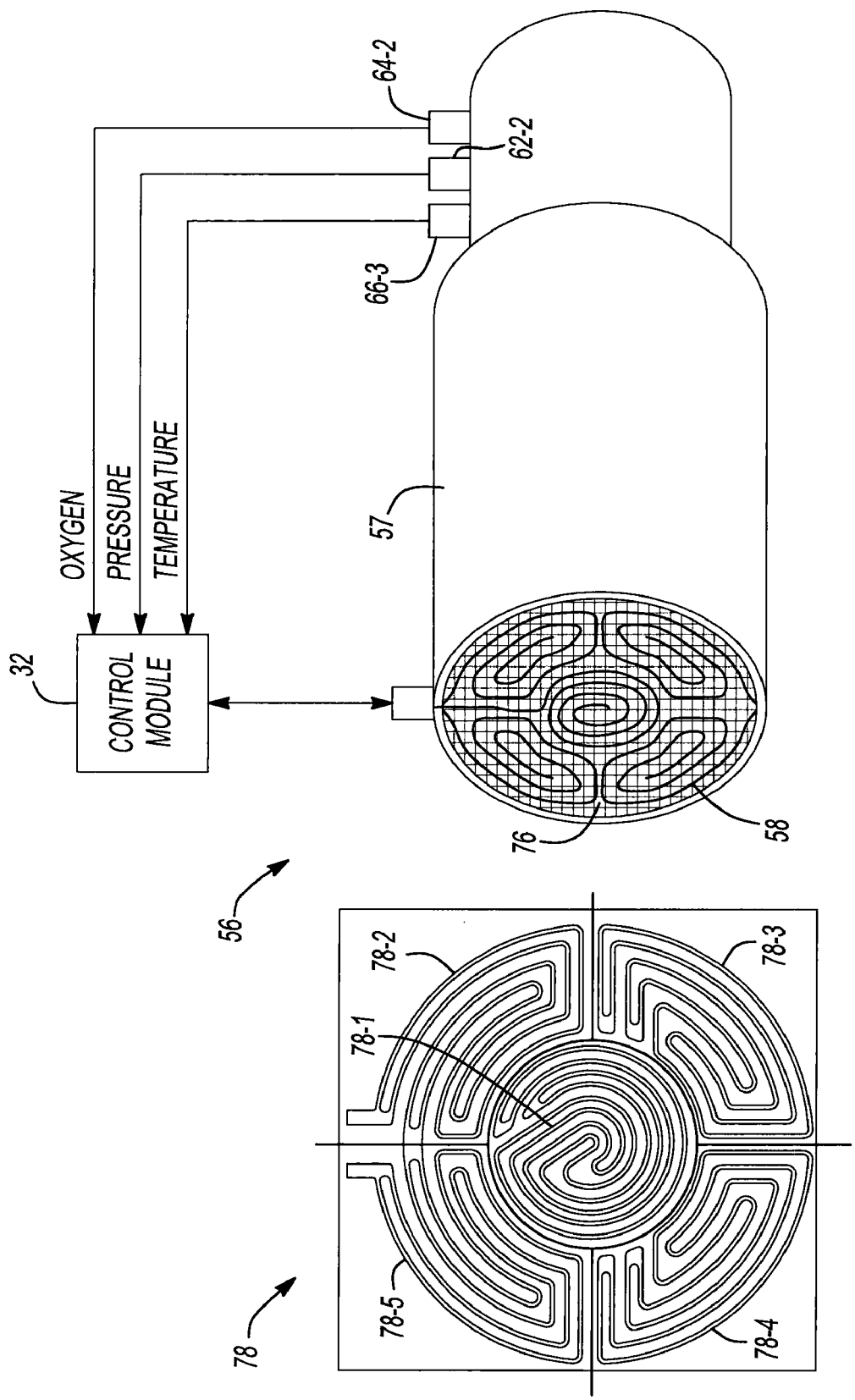
FIG. 2 illustrates an exemplary electrically heated particulate filter according to the principles of the present disclosure.
Figure 3:
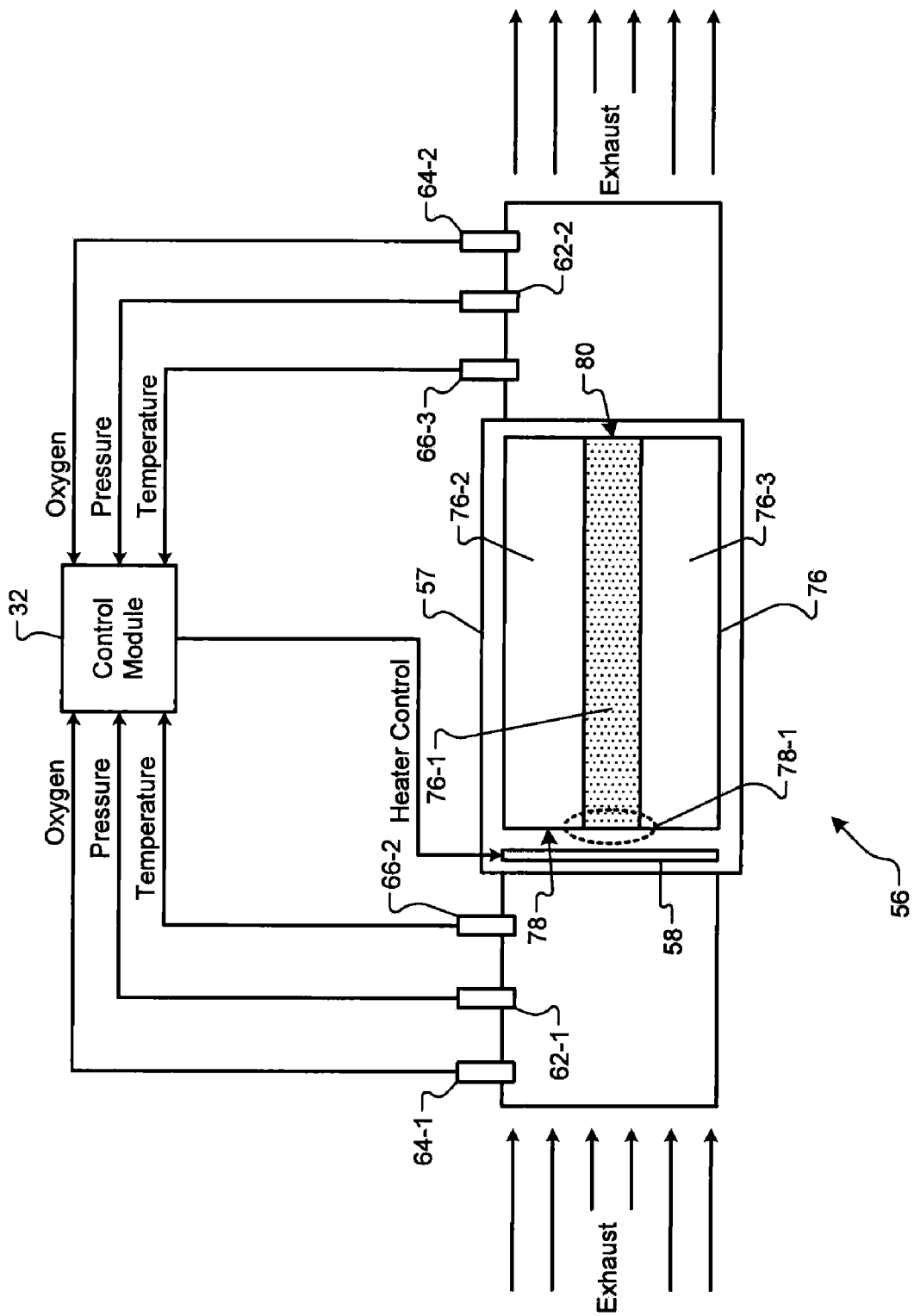
FIG. 3 illustrates regeneration of the exemplary electrically heated particulate filter according to the principles of the present disclosure.

Referring now to FIGS. 2 and 3, an exemplary embodiment of the filter assembly 56 is shown. The filter assembly 56 may include a housing 57, a particulate filter 76, and the heater 58. The heater 58 may be arranged between a laminar flow element (not shown) and a substrate of the filter 76. The substrate may be constructed or formed from a metal and/or ceramic material.

The heater 58 may comprise one or more coils, heater segments, or conductive elements that provide heating to initiate regeneration. For example only, the heater 58 may heat a first zone 78-1 of an inlet face 78 of the filter 76 in contact with or spaced from heater 58. The heater 58 may initiate regeneration in the zone 78-1 by increasing a temperature in the filter assembly 56 to be greater than or equal to a PM combustion temperature. For example only, the PM combustion temperature may be between 700° C. and 1000° C.

The control module 32 may provide a signal to the heater 58 that activates the heater 58. The control module 32 may determine the temperature in the filter assembly 56 based on the exhaust temperatures from the exhaust temperature sensors 66. The heater 58 may be in contact with or spaced from the filter 76 such that the heat provided to the zone 78-1 is convection and/or conduction heating. Exhaust enters the filter assembly 56 from the DOC 54 and is heated by the heater 58.

The heater 58 heats the exhaust passing through the heater 58. The heated exhaust travels to the filter 76 and heats zone 78-1 near the heater 58 by convection and/or conduction. When the PM near zone 78-1 reaches the PM combustion temperature, the heater 58 may be deactivated. The control module 32 may determine that the PM combustion temperature has been reached based on an inlet temperature from the sensor 66-2. PM near zone 78-1 ignites due to the increased temperature and initiates regeneration.

Regeneration continues through a first portion 76-1 of the filter 76. The first portion 76-1 may extend from the zone 78-1 on the inlet face 78 to an outlet face 80 of the filter 76. Regeneration of the first portion 76-1 may be achieved using the heat and oxygen present in the exhaust and energy released by combustion of PM inside the first portion 76-1. Combustion of the PM cascades down the first portion 76-1 without requiring power to be maintained to the electric heater 58.

While the first portion 76-1 regenerates, the exhaust temperature inside the filter 76 may increase. Initially, the temperature sensor 66-3 may not detect an increase in exhaust gas temperature because the thermal mass of the filter 76 may absorb heat generated by regeneration. More specifically, as the cascading PM moves closer to the outlet face 80 of the filter 76, the sensor 66-3 may detect an increase in the outlet exhaust gas temperature. When regeneration of the first portion 76-1 completes, the outlet exhaust gas temperature at the sensor 66-3 falls below a regeneration completion temperature.

Regeneration may occur in other portions by additional heaters disposed over various zones of the inlet face 78. When regeneration of the first portion 76-1 is complete, the control module 32 may initiate regeneration in remaining zones of the inlet face 78. The control module 32 may determine an available volume within the filter 76 to regenerate PM based on a duration of the regeneration initiated in each of the zones.

The remaining zones of the inlet face 78 may include a second zone 78-2, a third zone 78-3, a fourth zone 78-4, and a fifth zone 78-5. PM may be regenerated in portions of the filter 76 that correspond to each of the remaining zones. For example only, regeneration initiated in zones 78-2 and 78-3 may regenerate PM in second and third portions 76-2 and 76-3 of the filter 76 that respectively extend from the zones 78-2 and 78-3 to the outlet face 80.

Figure 4:
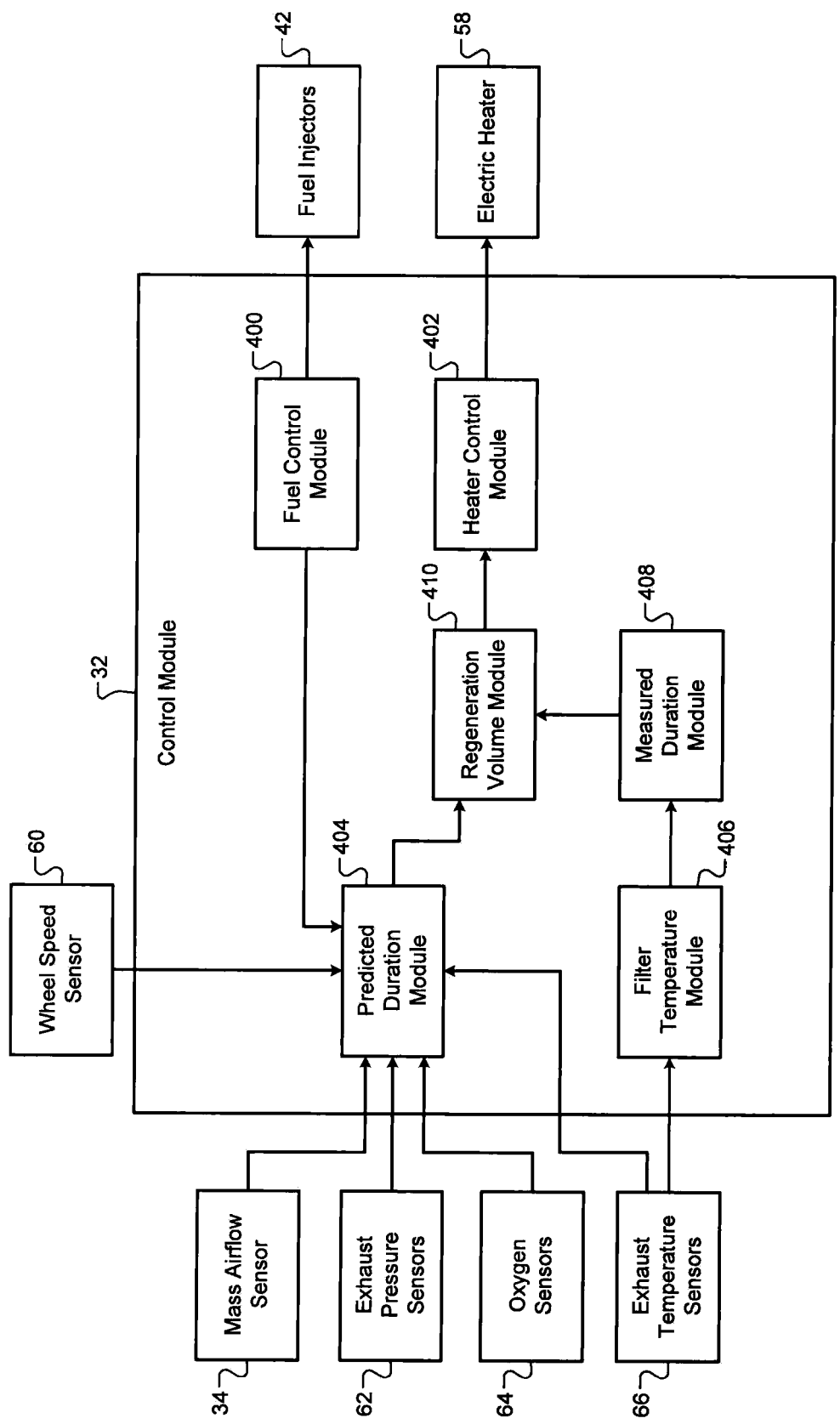
FIG. 4 is a functional block diagram of an exemplary control module according to the principles of the present disclosure.

Referring now to FIG. 4, the control module 32 may include a fuel control module 400, a heater control module 402, a predicted duration module 404, a filter temperature module 406, a measured duration module 408, and a regeneration volume module 410. The fuel control module 400 controls the fuel injectors 42 to inject fuel. The fuel control module 400 monitors a mass of fuel injected by the fuel injectors 42. The fuel control module 400 may also determine a vehicle operation period based on control of the fuel injectors 42. The heater control module 402 may control the electric heater 58 to initiate regeneration in one or more zones of an inlet face of the filter assembly 56.

The predicted duration module 404 may receive the vehicle operation period from the fuel control module 400. Alternatively, the predicted duration module may receive the vehicle operation period from another module that controls or detects vehicle operation. The predicted duration module 404 may determine a vehicle operation distance based on the vehicle speed received from the wheel speed sensor 60. For example only, the vehicle operation distance may be the product of the vehicle operation period and the wheel speed.

The predicted duration module 404 may receive the flow rate of intake air from the MAF sensor 34, the exhaust pressures from the exhaust pressure sensors 62, the oxygen levels in the exhaust from the oxygen sensors 64, the exhaust temperatures from the exhaust temperature sensors 66, and the mass of fuel injected from the fuel control module 400. The predicted duration module 404 may determine a mass flow rate of the exhaust based on the flow rate of the intake air and the mass of fuel injected.

The predicted duration module 404 may determine a predicted duration of the regeneration initiated in each of the zones based on the exhaust temperatures, the mass flow rate of the exhaust, and/or the oxygen levels in the exhaust. The predicted duration may be related to the exhaust temperatures, the mass flow rate of the exhaust, and the oxygen levels in the exhaust. Relationships between the predicted duration and exhaust system parameters may be predetermined via calibration.

The predicted duration module 404 may determine the predicted duration of the regeneration initiated in each of the zones based on a particulate matter (PM) level in the exhaust. The predicted duration module 404 may determine the PM level in the exhaust based on the vehicle operation period, the vehicle operation distance, and/or a difference between the exhaust pressures measured upstream and downstream from the filter assembly 56. The PM level in the exhaust may be directly related to the vehicle operation period, the vehicle operation distance, and the difference between the exhaust pressures.

The filter temperature module 406 may receive the exhaust temperatures from the exhaust temperature sensors 66. The filter temperature module 406 may estimate one or more temperatures in the filter assembly 56 based on the exhaust temperatures. Alternatively, the filter temperature module 406 may receive the temperatures in the filter assembly 56 from one or more temperature sensors (not shown) in the filter assembly 56.

The filter temperature module 406 may estimate an inlet temperature of the filter assembly 56 based on the exhaust temperature received from the sensor 66-2. The filter temperature module 406 may estimate an outlet temperature of the filter assembly 56 based on the exhaust temperature received from the sensor 66-3. The filter temperature module 406 may provide the inlet and outlet temperatures to the measured duration module 408.

The measured duration module 408 may measure a duration of the regeneration initiated in each of the zones based on the temperatures in the filter assembly 56. The measured duration module 408 may determine that the measured duration of the regeneration starts when the inlet temperature is greater than a PM combustion temperature. The measured duration module 408 may determine that the measured duration of the regeneration ends when the outlet temperature is less than a regeneration completion temperature.

The regeneration volume module 410 may receive the predicted duration from the predicted duration module 404 and the measured duration from the measured duration module 408. The regeneration volume module 410 may determine an available volume within the filter assembly 56 to regenerate PM based on the predicted and measured durations for each of the zones.

More specifically, the regeneration volume module 410 may determine an available volume percentage of each zone based on the predicted and measured durations. The regeneration volume module 410 may weight the available volume percentage of each zone based on a portion of the inlet face that each zone includes. The regeneration volume module 410 may average the available volume percentages, or weighted available volume percentages, of the zones to determine the available volume percentage of the filter assembly 56. The regeneration volume module 410 may determine the available volume within the filter assembly 56 based on the available volume percentage of the filter assembly 56 and a predetermined volume of the filter assembly 56.

Figure 5:
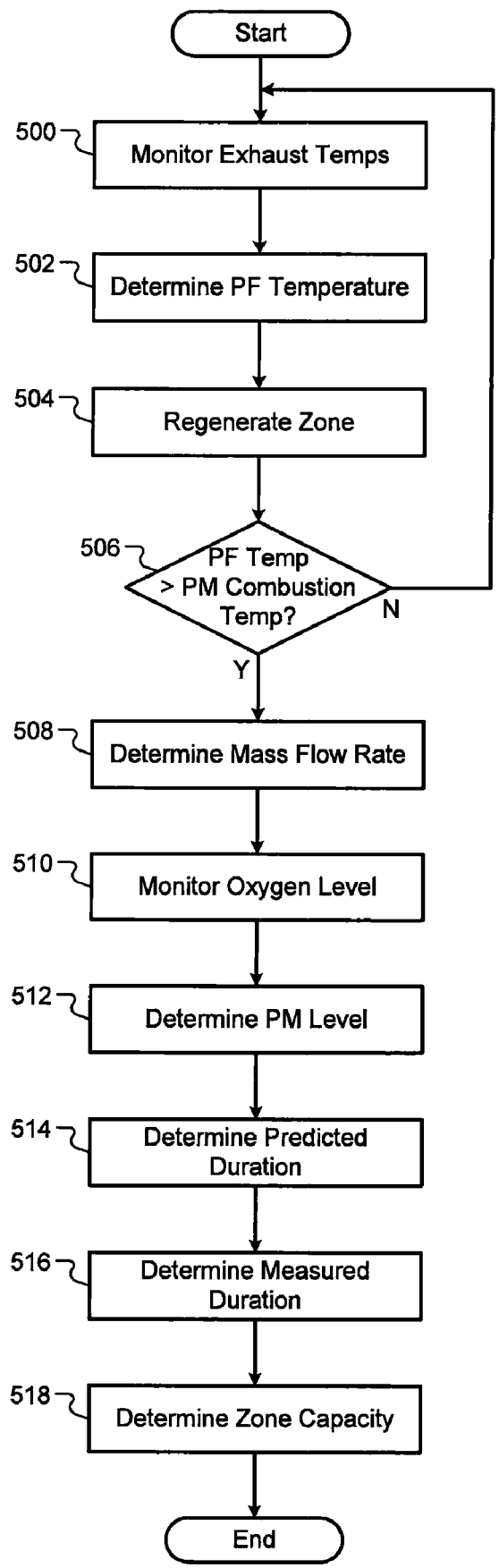
FIG. 5 is a flowchart depicting exemplary steps of a control method according to the principles of the present disclosure.

Referring now to FIG. 5, a flowchart depicts exemplary steps of a control system according to the principles of the present disclosure. In step 500, control monitors exhaust temperatures. In step 502, control estimates a particulate filter (PF) temperature based on the exhaust temperatures. In step 504, control activates a heater to initiate regeneration in a zone of an inlet face of a particulate filter.

In step 506, control determines whether the PF temperature is greater than a PM combustion temperature. When the PF temperature is less than or equal to the PM combustion temperature, control returns to step 500. When the PF temperature is greater than the PM combustion temperature, indicating that the regeneration is initiated, control proceeds to step 508.

In step 508, control determines a mass flow rate of exhaust. Control may determine the mass flow rate of the exhaust based on a flow rate of intake air and a mass of fuel injected. In step 510, control monitors one or more oxygen levels in the exhaust.

In step 512, control determines a particulate matter (PM) level in the exhaust. Control may determine the PM level in the exhaust based on a vehicle operation period, a vehicle operation distance, and/or a difference in exhaust pressures measured upstream and downstream from a particulate filter. The PM level in the exhaust may be directly related to the vehicle operation period, the vehicle operation distance, and the difference between the exhaust pressures.

In step 514, control determines a predicted duration of the regeneration based on the exhaust temperatures, the mass flow rate, the oxygen levels, and/or the PM level. In step 516, control measures a duration of the regeneration based on the PF temperature. Control may determine that the measured duration starts when the PF temperature rises above a PM combustion temperature and ends when the PF temperature falls below a regeneration completion temperature. In step 518, control determines an available volume within the particulate filter to regenerate PM based on the predicted and measured durations associated with each of the zones.

More specifically, control may determine an available volume percentage for each of the zones by dividing the measured duration by the predicted duration. Control may determine an available volume percentage of the particulate filter by averaging the available volume percentages associated with each of the zones. Control may determine the available regeneration volume within the particulate filter based on the available volume percentage of the particulate filter and a predetermined volume of the particulate filter.

Control may weight the available volume percentages associated with each of the zones based on a portion of the inlet face that each zone includes. Control may determine the available volume percentage of the particulate filter by averaging the weighted available volume percentages associated with each of the zones. Control may repeat steps 500 through 518 for each of the zones of the particulate filter in which the regeneration is initiated.

In this manner, control may develop an ash loading profile for the particulate filter using the available volume percentages associated with each of the zones. The available volume associated with a zone may be determined based on the available volume percentage associate with the zone and a predetermined volume of a portion of the particulate filter corresponding to the zone. The amount of ash accumulated in the portion of the particulate filter may be inversely related to the available volume associated with the zone. Increasing the number of zones may improve the accuracy of the ash loading profile.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
    a heater control module that selectively initiates a regeneration in a zone of a particulate filter in an exhaust system;
    a measured duration module that measures a duration of said regeneration; and
    a regeneration volume module that determines an available volume within said particulate filter to regenerate particulate based on said measured duration of said regeneration.

2. The control system of claim 1, further comprising a predicted duration module that determines a predicted duration of said regeneration.

3. The control system of claim 2, wherein said regeneration volume module determines said available volume based on said predicted duration and said measured duration.

4. The control system of claim 3, wherein said zone includes multiple zones and said available volume is determined based on said predicted duration and said measured duration for each of said multiple zones.

5. The control system of claim 4, wherein said predicted duration module determines said predicted duration based on at least one of an exhaust temperature, a mass flow rate, an oxygen level, and a particulate matter level.

6. The control system of claim 5, further comprising a particulate matter level module that determines said particulate matter level based on at least one of a vehicle operation period, a vehicle operation distance, and a pressure difference between an inlet and an outlet of said particulate filter.

7. The control system of claim 4, wherein said measured duration module determines said measured duration based on a temperature in said particulate filter.

8. The control system of claim 7, wherein said measured duration starts when said temperature in said particulate filter is greater than a PM combustion temperature and ends when said temperature in said particulate filter is less than a regeneration completion temperature.

9. The control system of claim 4, wherein each of said multiple zones includes a portion of an inlet face of said particulate filter.

10. The control system of claim 9, wherein said available volume is determined by weighting said predicted duration and said measured duration based on said portion of said inlet face that each of said multiple zones includes.

11. A method, comprising:
selectively initiating a regeneration in a zone of a particulate filter in an exhaust system;
measuring a duration of said regeneration; and
determining an available volume within said particulate filter to regenerate particulate based on said measured duration of said regeneration.

12. The method of claim 11, further comprising determining a predicted duration of said regeneration.

13. The method of claim 12, further comprising determining said available volume based on said predicted duration and said measured duration.

14. The method of claim 13, wherein said zone includes multiple zones, the method further comprising determining said available volume based on said predicted duration and said measured duration for each of said multiple zones.

15. The method of claim 14, further comprising determining said predicted duration based on at least one of an exhaust temperature, a mass flow rate, an oxygen level, and a particulate matter level.

16. The method of claim 15, further comprising determining said particulate matter level based on at least one of a vehicle operation period, a vehicle operation distance, and a pressure difference between an inlet and an outlet of said particulate filter.

17. The method of claim 14, further comprising determining said measured duration based on a temperature in said particulate filter.

18. The method of claim 17, further comprising starting said measured duration when said temperature in said particulate filter is greater than a PM combustion temperature and ending said measured duration when said temperature in said particulate filter is less than a regeneration completion temperature.

19. The method of claim 14, wherein each of said multiple zones includes a portion of an inlet face of said particulate filter.

20. The method of claim 19, further comprising determining said available volume by weighting said predicted duration and said measured duration based on said portion of said inlet face that each of said multiple zones includes.

* * * * *